US012657680B1

(12) United States Patent
Hever

(10) Patent No.: US 12,657,680 B1
(45) Date of Patent: Jun. 16, 2026

(54) MULTI-MODAL AUTOMOTIVE PAINT AUTHENTICATION AND REPAINTING DETECTION SYSTEM

(71) Applicant: UVeye Ltd., Tel Aviv (IL)

(72) Inventor: Amir Hever, Tenafly, NJ (US)

(73) Assignee: UVeye Ltd., Tel Aviv (IL)

( * ) Notice: Subject to any disclaimer, the term of this patent is extended or adjusted under 35 U.S.C. 154(b) by 0 days.

(21) Appl. No.: 19/347,817

(22) Filed: Oct. 2, 2025

(51) Int. Cl.
| | |
|---|---|
| *G06T 7/00* | (2017.01) |
| *G01N 21/21* | (2006.01) |
| *G01N 21/3563* | (2014.01) |
| *G01N 21/64* | (2006.01) |
| *G01N 21/88* | (2006.01) |
| *G06Q 40/08* | (2012.01) |
| *G06T 7/80* | (2017.01) |
| *G06T 11/00* | (2026.01) |
| *G06V 10/143* | (2022.01) |
| *G06V 10/58* | (2022.01) |
| *G06V 10/774* | (2022.01) |
| *G06V 20/00* | (2022.01) |
| *H04N 23/11* | (2023.01) |
| *H04N 23/13* | (2023.01) |
| *H04N 23/60* | (2023.01) |
| *H04N 23/74* | (2023.01) |

(52) U.S. Cl.
CPC .......... *G06T 7/0002* (2013.01); *G01N 21/21* (2013.01); *G01N 21/3563* (2013.01); *G01N 21/6456* (2013.01); *G01N 21/8806* (2013.01); *G06Q 40/083* (2025.08); *G06T 7/80* (2017.01); *G06T 11/00* (2013.01); *G06V 10/143* (2022.01); *G06V 10/58* (2022.01); *G06V 10/774* (2022.01); *G06V 20/95* (2022.01); *H04N 23/11* (2023.01); *H04N*

*23/13* (2023.01); *H04N 23/64* (2023.01); *H04N 23/74* (2023.01); *G06T 2207/10048* (2013.01); *G06T 2207/10064* (2013.01); *G06T 2207/10152* (2013.01); *G06T 2207/20081* (2013.01)

(58) Field of Classification Search
None
See application file for complete search history.

(56) References Cited

U.S. PATENT DOCUMENTS

2021/0312702 A1 * 10/2021 Holzer ...................... G06T 7/70

FOREIGN PATENT DOCUMENTS

EP          3696537 B1  *  2/2019

* cited by examiner

*Primary Examiner* — Christopher Braniff

(57) ABSTRACT

There is provided a method of automatically detecting paint anomalies on a vehicle, comprising: operating illumination elements configured for generating illuminations of different types at first different frequency bands and/or at first different polarization angles, positioned for illuminating the vehicle, operating image sensors for capturing the images, wherein the image sensors are of different modalities configured for sensing at second different frequency bands and/or at second different polarization angles configured for capturing images of a vehicle, extracting features from the images, generating a multi-dimensional dataset by aggregating the features, feeding the multi-dimensional dataset into a machine learning model, obtaining from the machine learning model, an indication of a region of the vehicle with a paint anomaly, generating an enhanced image depicting the region of the vehicle with the paint anomaly overlaid with a visual indication of the region with the paint anomaly, and presenting the enhanced image on a display.

15 Claims, 2 Drawing Sheets

100

Figure 2:
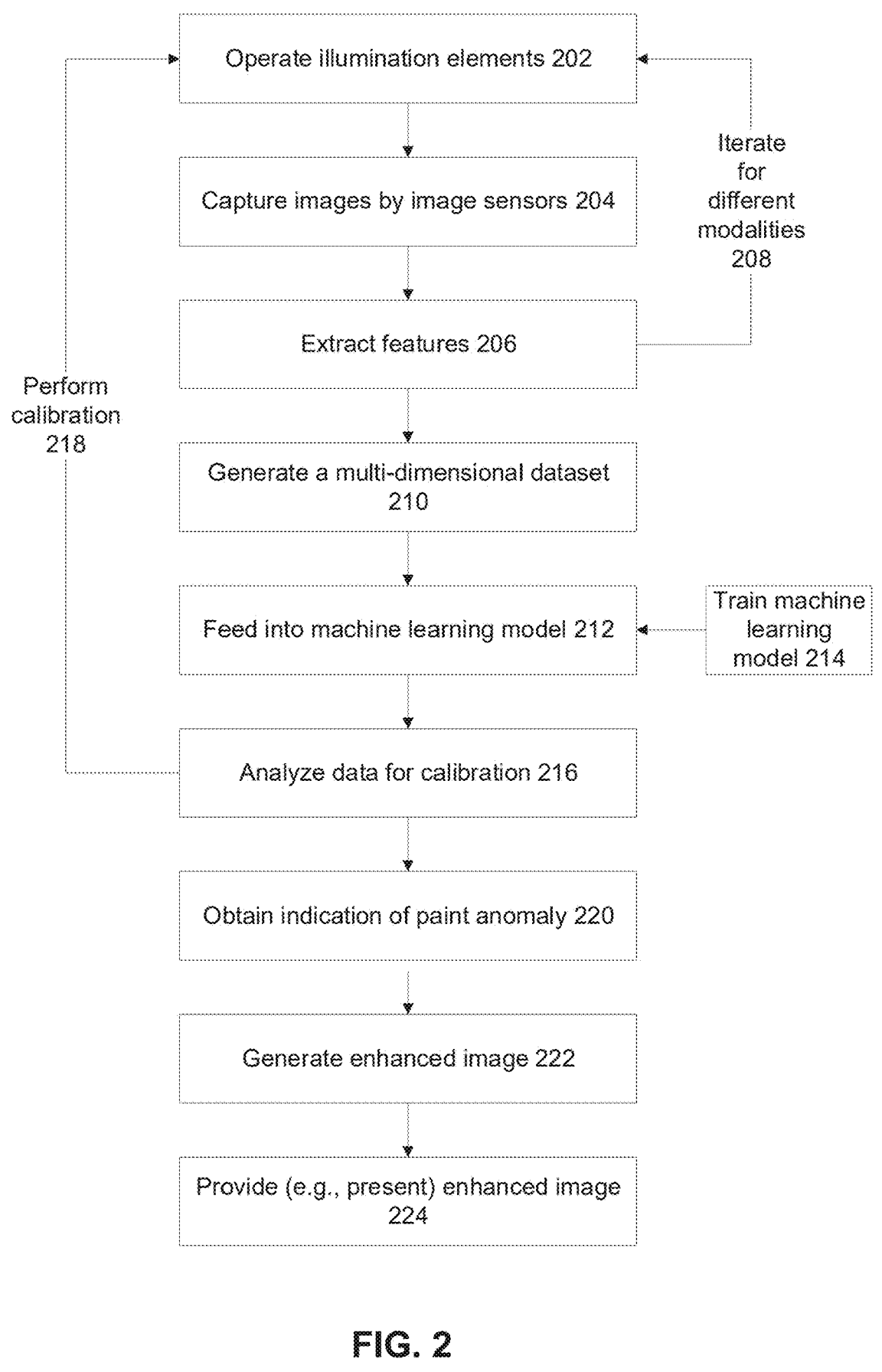

Operate illumination elements 202

Capture images by image sensors 204

Extract features 206

Iterate for different modalities 208

Generate a multi-dimensional dataset 210

Feed into machine learning model 212

Train machine learning model 214

Analyze data for calibration 216

Perform calibration 218

Obtain indication of paint anomaly 220

Generate enhanced image 222

Provide (e.g., present) enhanced image 224

MULTI-MODAL AUTOMOTIVE PAINT AUTHENTICATION AND REPAINTING DETECTION SYSTEM

FIELD AND BACKGROUND OF THE INVENTION

The present invention, in some embodiments thereof, relates to image processing and, more specifically, but not exclusively, to systems and methods for analyzing images for detecting paint anomalies on a vehicle.

Paint anomalies may be applied to a vehicle during repair of damage and/or in an attempt to cover up or hide the damage.

SUMMARY OF THE INVENTION

According to a first aspect, a system for automatically detecting paint anomalies on a surface of a vehicle, comprising: a plurality of illumination elements configured for generating a plurality of illuminations of different types at a first plurality of different frequency bands and/or at a first plurality of different polarization angles, positioned for illuminating the vehicle, a plurality of image sensors of a plurality of different modalities configured for sensing at a second plurality of different frequency bands and/or at a second plurality of different polarization angles configured for capturing a plurality of images of a vehicle, a data interface configured to access and/or receive a plurality of images captured by the plurality of image sensors during illumination by the plurality of illumination elements, at least one processor configured for: operating the plurality of illumination elements for illuminating the vehicle, operating the plurality of image sensors for capturing the plurality of images, extracting a plurality of features from the plurality of images, generating a multi-dimensional dataset by aggregating the plurality of features, feeding the multi-dimensional dataset into a machine learning model, obtaining from the machine learning model, an indication of a region of the vehicle with a paint anomaly, generating an enhanced image depicting the region of the vehicle with the paint anomaly overlaid with a visual indication of the region with the paint anomaly, and presenting the enhanced image on a display.

According to a second aspect, a computer implemented method of automatically detecting paint anomalies on a surface of a vehicle, comprises: operating a plurality of illumination elements for illuminating the vehicle, wherein the plurality of illumination elements are configured for generating a plurality of illuminations of different types at a first plurality of different frequency bands and/or at a first plurality of different polarization angles, positioned for illuminating the vehicle, operating a plurality of image sensors for capturing the plurality of images, wherein the plurality of image sensors are of a plurality of different modalities configured for sensing at a second plurality of different frequency bands and/or at a second plurality of different polarization angles configured for capturing a plurality of images of a vehicle, extracting a plurality of features from the plurality of images, generating a multi-dimensional dataset by aggregating the plurality of features, feeding the multi-dimensional dataset into a machine learning model, obtaining from the machine learning model, an indication of a region of the vehicle with a paint anomaly, generating an enhanced image depicting the region of the vehicle with the paint anomaly overlaid with a visual indication of the region with the paint anomaly, and presenting the enhanced image on a display.

According to a third aspect, a non-transitory medium storing program instructions for automatically detecting paint anomalies on a surface of a vehicle, which when executed by at least one processor, cause the at least one processor to: operate a plurality of illumination elements for illuminating the vehicle, wherein the plurality of illumination elements are configured for generating a plurality of illuminations of different types at a first plurality of different frequency bands and/or at a first plurality of different polarization angles, positioned for illuminating the vehicle, operate a plurality of image sensors for capturing the plurality of images, wherein the plurality of image sensors are of a plurality of different modalities configured for sensing at a second plurality of different frequency bands and/or at a second plurality of different polarization angles configured for capturing a plurality of images of a vehicle, extract a plurality of features from the plurality of images, generate a multi-dimensional dataset by aggregating the plurality of features, feed the multi-dimensional dataset into a machine learning model, obtain from the machine learning model, an indication of a region of the vehicle with a paint anomaly, generate an enhanced image depicting the region of the vehicle with the paint anomaly overlaid with a visual indication of the region with the paint anomaly, and present the enhanced image on a display.

In a further implementation form of the first, second, and third aspects, further comprising creating a training dataset of a plurality of records by: creating a record for each sample vehicle of a plurality of sample vehicles including a first subset with a paint anomaly and a second subset without a paint anomaly: operating the plurality of illumination elements for illuminating the sample vehicle, operating the plurality of image sensors for capturing a plurality of images of different modalities of the sample vehicle, extracting at least one feature from each of the plurality of images of different modalities, and generating a multi-dimensional dataset from the plurality of features, wherein the record for the sample vehicle includes the multi-dimensional dataset and a ground truth label indicating whether the sample vehicle depicted the paint anomaly or did not depict the paint anomaly, and training the machine learning model on the training dataset.

In a further implementation form of the first, second, and third aspects, further comprising calibrating at least one of the plurality of image sensors and/or at least one of the plurality of illumination elements according to output of the machine learning model in response to the feeding.

In a further implementation form of the first, second, and third aspects, the calibration is performed by adapting one or more parameters of the at least one of the plurality of image sensors and/or at least one of the plurality of illumination elements until a confidence score of the detection of the region of the paint anomaly by the machine learning model exceeds a threshold.

In a further implementation form of the first, second, and third aspects, further comprising analyzing the plurality of images of the vehicle to identify an inadequate region of the vehicle that is not captured in at least one image and/or is not adequately depicted in at least one image to obtain a confidence score of detection above a threshold, and operating at least one actuator of at least one of the plurality of image sensors and/or at least one of the plurality of illumination elements for adapting a pose and/or field of view thereof until the inadequate region is adequately captured in at least one image for obtaining the confidence score of detection above the threshold.

In a further implementation form of the first, second, and third aspects, the plurality of illumination elements simultaneously generate illumination, and the plurality of image sensors simultaneously capture the plurality images during the illumination.

In a further implementation form of the first, second, and third aspects, the plurality of illumination elements and the plurality of image sensors are arranged into the plurality of imaging modalities, selected from: (i) an ultraviolet (UV) fluorescence imaging subsystem including at least one UV illumination element operating at about 365 nanometer (nm) wavelength, at least one fluorescence camera equipped with at least one filter for isolating specific wavelength ranges selected from 400-700 nm emitted by the paint in response to the UV illumination, (ii) a polarized light analysis subsystem including polarized light sources with adjustable polarization angles, and image sensors associated with polarization filter configured to analyze reflected light characteristics, (iii) a spectroscopic examination subsystem including near-infrared spectroscopy devices covering wavelengths from about 800-2500 nm, and (iv) and a red-green-blue (RGB) camera.

In a further implementation form of the first, second, and third aspects, further comprising adding metadata of the vehicle to the multi-dimensional dataset fed into the machine learning model, the metadata including at least one of: vehicle manufacturer, year of manufacture, vehicle model, geographical location of manufacturing, and color.

In a further implementation form of the first, second, and third aspects, at least one feature of the plurality of features for a UV fluorescence imaging subsystem comprises a fluorescent signature generated by fluorescent compounds in paint formulations emitting characteristic signatures that are captured by at least one fluorescence camera in response to the UV excitation sources illuminating the paint surface, wherein inconsistencies are indicative of the paint anomaly.

In a further implementation form of the first, second, and third aspects, the at least one feature is selected from: fluorescence intensity variations indicating different paint formulations, spectral shift patterns suggesting primer or basecoat differences, fluorescence uniformity disruptions indicating repair boundaries, and temporal fluorescence decay differences revealing paint age inconsistencies.

In a further implementation form of the first, second, and third aspects, at least one feature of the plurality of features for a polarized light analysis subsystem comprises polarization-dependent reflectance properties that indicate the paint anomaly, surface texture variations that indicate surface texture inconsistencies, coating thickness differences, and paint layer disruptions.

In a further implementation form of the first, second, and third aspects, the at least one feature is selected from: degree of polarization measurements for surface texture evaluation, polarization angle analysis for coating thickness assessment, depolarization measurements for surface roughness determination, and polarization contrast analysis for repair boundary detection.

In a further implementation form of the first, second, and third aspects, at least one feature of the plurality of features for a spectroscopic examination subsystem comprises non-destructive chemical composition analysis to compute at least one chemical analysis parameter.

In a further implementation form of the first, second, and third aspects, the at least one chemical analysis parameter is selected from: paint formulation differences, organic compound identification for paint type determination, pigment analysis for color matching verification, additive detection for formulation consistency assessment, primer layer identification for repair detection, chemical markers indicative of the paint anomaly.

In a further implementation form of the first, second, and third aspects, further comprising a fiber optic probe configured for close-range analysis.

In a further implementation form of the first, second, and third aspects, the paint anomaly is selected from: paint layer inconsistencies, chemical composition variations, surface texture anomalies, paint repair signatures, refinishing patterns, and authenticity markers.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 2 is a flowchart of a method for automatically detecting paint anomalies on a surface of a vehicle, in accordance with some embodiments of the present invention.

DESCRIPTION OF SPECIFIC EMBODIMENTS OF THE INVENTION

Figure 1:
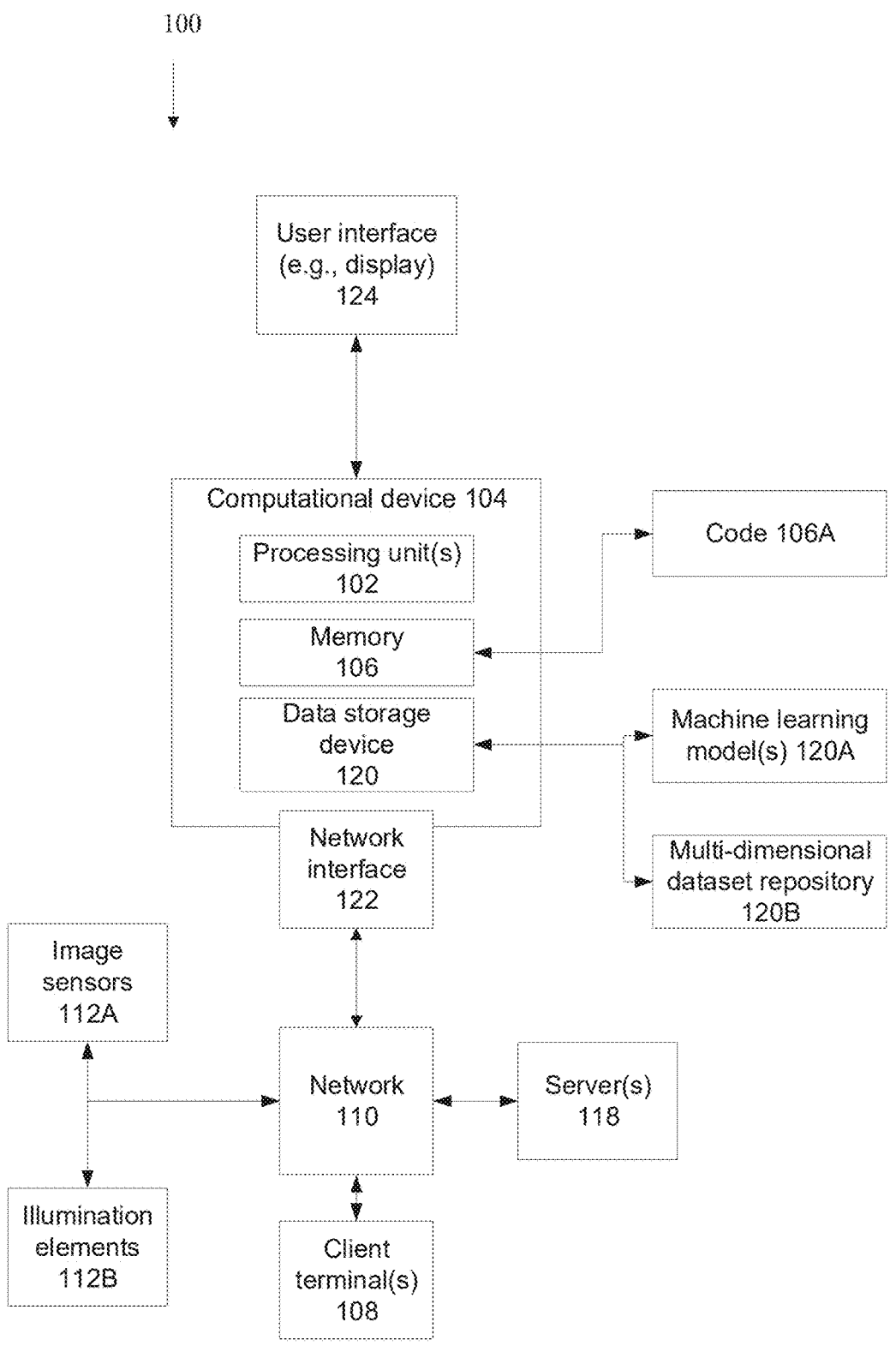
FIG. 1 is a block diagram of components of a system for automatically detecting paint anomalies on a surface of a vehicle, in accordance with some embodiments of the present invention.

The present invention, in some embodiments thereof, relates to image processing and, more specifically, but not exclusively, to systems and methods for analyzing images for detecting paint anomalies on a vehicle.

As used herein, the term vehicle may refer to a car, for example, sedan, sports car, minivan, SUV, and the like. However, it is to be understood that embodiments described herein may be used to detect damage in other vehicles, for example, buses, hulls of boats, and aircraft.

As used herein, the term paint anomaly (on the surface of the vehicle) which is being detected using one or more embodiments described herein refers to, for example, a region of local paint arising from repair of damage, and/or from use of non-authentic paint. For example, a side of the car is scratched by a passing cycle. The scratch is repaired by locally applying touch-up paint. In another example, a bumper was hit and dented. The bumper was repaired by straightening the dent and applying paint that is different than the original manufacturer's paint. In yet another example, the paint may be applied to hide rust, or after the rust has been removed. Paint anomalies may point to damage that occurred to the vehicle which may have been repaired, and may be undetected by the human eye. Paint anomalies may be a sign of more severe structural damage. Paint anomalies may indicate that the value of the car should be lower than it would otherwise be without the paint anomaly.

An aspect of some embodiments of the present invention relates to systems, methods, computing devices, and/or code instructions, for automatically detecting paint anomalies on a surface of a vehicle. Multiple illumination elements are operated for illuminating the vehicle. The illumination elements are designed for generating different illuminations of different types at different frequency bands (e.g., ultraviolet (UV), near-infrared, and visible light) and/or at different polarization angles. Multiple image sensors capture images under the illumination (also referred to herein as illuminated images). The image sensors are of different modalities sensing at different frequency bands and/or different polarization angles, corresponding to the illumination elements, for example, UV, near-infrared, visible light, and polarization. Multiple features are extracted from the illuminated images. A multi-dimensional dataset is generated by aggregating the extracted features. The multi-dimensional dataset is fed into a machine learning model. An indication of a region of the vehicle with a paint anomaly is obtained from the machine learning model. An enhanced image depicting the region of the vehicle with the paint anomaly overlaid with a visual indication of the region with the paint anomaly is generated. The enhanced image may be outputted by the machine learning model. The enhanced image is provided, for example, presented on a display.

At least one embodiment described herein addresses the technical problem of automatically detecting paint anomalies on a surface of a vehicle. At least one embodiment described herein improves the technology of image processing for fraud detection, by automatically analyzing images for detecting paint anomalies on a surface of a vehicle. At least one embodiment described herein improves upon existing approaches for detecting paint anomalies on a surface of a vehicle. At least one embodiment described herein provides the practical approach of automatically analyzing images for detecting paint anomalies on a surface of a vehicle.

The automotive industry faces significant challenges in accurately detecting paint anomalies, for example, paint repairs, refinishing operations, and authenticity verification, for vehicles in various contexts, for example, insurance claims, fraud prevention, used car sales, and forensic investigations. Current paint detection methods rely primarily on visual inspection, basic color matching, or simple spectroscopic analysis, which often fail to detect sophisticated repainting operations or subtle paint inconsistencies.

Traditional paint inspection techniques suffer from several limitations. Visual inspection is subjective and often inaccurate, particularly for high-quality paint repairs. Basic color matching systems cannot detect underlying paint layers or chemical composition differences. Single-mode spectroscopic analysis provides limited information about complex paint structures and may miss critical authenticity markers.

Existing paint detection systems typically focus on color matching for repair purposes rather than authenticity verification. Prior art systems fail to integrate multiple sensing modalities in a coordinated manner to provide comprehensive paint analysis. Furthermore, current systems lack the sophisticated artificial intelligence processing capabilities necessary to analyze complex multi-spectral data and identify subtle indicators of paint repair or refinishing operations.

At least one embodiment described herein solves the aforementioned technical problem, and/or improves upon the aforementioned technical field, and/or improves upon the aforementioned existing approaches, and/or provides the practical application of generating an enhanced image depicting a region of the vehicle with paint anomaly, by using multiple illumination elements for illuminating the vehicle. The illumination elements are designed for generating different illuminations of different types at different frequency bands (e.g., ultraviolet (UV), near-infrared, and visible light) and/or at different polarization angles. Multiple image sensors capture images under the illumination. The image sensors are of different modalities sensing at different frequency bands and/or different polarization angles, corresponding to the illumination elements, for example, UV, near-infrared, visible light, and polarization. Multiple features are extracted from the illuminated images. A multi-dimensional dataset is generated by aggregating the extracted features. The multi-dimensional dataset is fed into a machine learning model. An indication of a region of the vehicle with a paint anomaly is obtained from the machine learning model. An enhanced image depicting the region of the vehicle with the paint anomaly overlaid with a visual indication of the region with the paint anomaly is generated. The enhanced image may be outputted by the machine learning model. The enhanced image is provided, for example, presented on a display.

At least one embodiment described herein provides a comprehensive, multi-modal paint detection system that can accurately identify paint repairs, refinishing operations, and/or authenticity inconsistencies through advanced sensing technologies and intelligent analysis algorithms.

At least one embodiment described herein provides a multi-modal automotive paint authentication and repainting detection system that integrates four distinct sensing technologies: ultraviolet fluorescence imaging, polarized light analysis, spectroscopic examination, and artificial intelligence processing to achieve unprecedented accuracy in paint authenticity verification.

At least one embodiment described herein relates to a multi-modal automotive paint authentication and/or repainting detection system (also referred to herein as the system for short) that integrates ultraviolet fluorescence imaging, polarized light analysis, spectroscopic examination, and artificial intelligence processing to detect paint anomalies, for example, paint repairs, refinishing, and/or authenticity inconsistencies on vehicle surfaces. The system employs a coordinated array of specialized sensors including UV fluorescence cameras, polarized light sources and detectors, near-infrared spectroscopy units, and high-resolution imaging devices, all controlled by an AI-powered analysis engine that processes multi-spectral data to identify paint anomalies, for example, layer inconsistencies, chemical composition variations, and/or surface texture anomalies indicative of repainting operations. At least one embodiment provides automotive forensic examination capabilities, for example, for insurance assessment, fraud detection, and/or vehicle history verification, through non-destructive analysis of paint authenticity markers.

At least one embodiment described herein relates to automotive surface analysis and/or forensic examination systems, in particular, to multi-modal sensing technologies for detecting paint anomalies, for example, paint repairs, refinishing, and/or authenticity verification on vehicle surfaces through integrated ultraviolet fluorescence, polarized light analysis, spectroscopy, and artificial intelligence processing.

At least one embodiment described herein provides the following features which solve the aforementioned technical problem, and/or improve upon the aforementioned technical field, and/or improve upon the aforementioned existing approaches, and/or provide the aforementioned practical application:

Multi-modal sensor fusion for comprehensive paint analysis.

UV fluorescence signature analysis for detecting paint layer differences.

Polarized light examination for surface texture and coating thickness evaluation.

Spectroscopic analysis for chemical composition verification.

AI-powered pattern recognition for subtle anomaly detection.

Integrated decision-making algorithms for paint authenticity assessment.

At least one embodiment described herein may operate through a coordinated analysis workflow beginning with vehicle positioning and sensor calibration. The multi-modal image sensors (e.g., array) may systematically scan the vehicle surfaces, acquiring data from all sensing modalities, optionally simultaneously. Real-time processing provides substantially immediate feedback on potential paint anomalies, while comprehensive analysis may generate detailed reports.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a block diagram of components of a system 100 for automatically detecting paint anomalies on a surface of a vehicle, in accordance with some embodiments of the present invention. Reference is also made to FIG. 2, which is a flowchart of a method for automatically detecting paint anomalies on a surface of a vehicle, in accordance with some embodiments of the present invention.

Referring now back to FIG. 1, system 100 may implement the features of the method(s) described herein, for example with reference to FIG. 2, by one or more hardware processors 102 of a computing device 104 executing code instructions stored in a memory (also referred to as a program store) 106.

System 100 may be referred to herein as a multi-modal automotive paint authentication and/or repainting detection system.

Computing device 104 may be implemented as, for example, a client terminal, a server, a virtual machine, a virtual server, a computing cloud, a group of interconnected computers, and the like.

Multiple architectures of system 100 based on computing device 104 may be implemented.

In an exemplary centralized implementation, computing device 104 storing code 106A may be implemented as one or more servers (e.g., network server, web server, a computing cloud, a virtual server) that provides services (e.g., one or more of the acts described with reference to FIG. 2 and/or other methods described herein) to one or more servers 118 and/or client terminals 108 over a network 110, for example, providing software as a service (SaaS) to the servers 118 and/or client terminal(s) 108, providing software services accessible using a software interface (e.g., application programming interface (API), software development kit (SDK)), providing an application for local download to the servers 118 and/or client terminal(s) 108, and/or providing functions using a remote access session to the servers 118 and/or client terminal(s) 108, such as through a web browser and/or viewing application. Client terminals 108 may be located in different geographical locations, for example, different vehicle dealerships and/or different garages and/or different vehicle inspection centers. For example, client terminals 108 may send locally captured images of a vehicle of different modalities captured by multiple different types of image sensors 112A positioned at different views, optionally illuminated by different types of illumination generated by different types of illumination elements 112B of the different imaging modalities (e.g., UV fluorescence, multispectral, visible light), to computing device 104. Computing device 104 may instruct calibration of the different sensors and/or different illumination elements. Computing device 104 may detect one or more regions of the vehicle with non-authenticated paint and/or that have undergone repainting. Computing device 104 may perform other image processing and/or analysis as described herein. One or more outcomes described herein may be provided by computing device 104 to respective client terminals 108, for example, one or more regions of the vehicle with non-authenticated paint and/or that have undergone repainting, such as a bounding box is generated on an input image depicting the region.

In an exemplary localized implementation, code 106A is locally executed by computing device 104. For example, computing device 104 is installed in a local used vehicle dealership and connected to locally installed image sensors and/or illumination elements. Images captured by the different image sensors optionally under different types of illumination are locally analyzed and/or processed as described herein. Calibration may be locally performed. Outcomes described herein may be presented on a display associated with computing device 104.

Image sensors 112A may be arranged at different views, optionally with at least some overlap, for capturing images of different parts of the surface of the vehicle.

Image sensors 112A are of multiple different imaging modalities. Exemplary image sensors 112A are described herein.

Illumination elements 112B generated different types of illumination for illumination of the vehicle. Exemplary illumination elements 112B are described herein. Images are captured by image sensors 112A while the illumination elements 112B are operating, i.e., the images are illuminated images.

Alternatively or additionally, system 100 may include one or more (e.g., three) sensing modalities integrated within a unified analysis platform, where each sensing modality includes a respective image sensor 112A and optionally a corresponding illumination element 112B. System 100 may include a UV fluorescence imaging subsystem, a polarized light analysis subsystem, and a spectroscopic examination subsystem.

Image sensors 112A may transmit captured images (e.g., illuminated images) to computing device 104, for example, via a direct connected (e.g., local bus and/or cable connection and/or short range wireless connection), and/or via a network 110 and a network interface 122 of computing device 104 (e.g., where sensors are connected via a wireless network, internet of things (IoT) technology and/or are located remotely from the computing device).

Network interface 122 may be implemented as, for example, a wire connection (e.g., physical port), a wireless connection (e.g., antenna), a network interface card, a wireless interface to connect to a wireless network, a physical interface for connecting to a cable for network connectivity, and/or virtual interfaces (e.g., software interface, application programming interface (API), software development kit (SDK), virtual network connection, a virtual interface implemented in software, network communication software providing higher layers of network connectivity).

Memory 106 stores code instructions executable by hardware processor(s) 102. Exemplary memories 106 include a random access memory (RAM), read-only memory (ROM), a storage device, non-volatile memory, magnetic media, semiconductor memory devices, hard drive, removable storage, and optical media (e.g., DVD, CD-ROM). For example, memory 106 may store code 106A that execute one or more acts of the method described with reference to FIG. 2 and/or other methods described herein.

Computing device 104 may include data storage device 120 for storing data, for example, machine learning model(s) 120A for detecting regions of non-authenticated paint and/or re-painting in an input multi-dimensional dataset, multi-dimensional dataset repository 120B designed for storing multi-dimensional datasets created from acquired illuminated images, and/or other data described herein. Data storage device 120 may be implemented as, for example, a memory, a local hard-drive, a removable storage unit, an optical disk, a storage device, a virtual memory and/or as a remote server 118 and/or computing cloud (e.g., accessed over network 110).

Computing device 104 and/or client terminal(s) 108 include and/or are in communication with one or more physical user interfaces 124 that include a mechanism for inputting data and/or for viewing data, for example, a display for presenting data such as images with detected region(s) of non-authenticated paint and/or re-painting and/or for entering data such as entering metadata of the vehicle. Exemplary user interfaces 124 include, for example, one or more of, a touchscreen, a display, a keyboard, a mouse, and voice activated software using speakers and microphone.

Referring now back to FIG. 2, at 202, illumination elements are operated for illuminating a surface of the vehicle.

The illumination elements are designed for generating illuminations of different types at different frequency bands. Alternatively or additionally, the illumination elements are designed for generating illumination at different polarization angles.

The illumination elements may be oriented to direct illumination to a specific region of the vehicle. The orientation may be adapted, for example by operating one or more actuators, to direct the illumination to different regions of the vehicle. The actuator may re-position the illumination elements to another location in space, in two dimensions and/or in three dimensions. The actuators may adjust the view of the illumination elements at the same location, for example, by adjusting the angle/tilt of the illumination element.

Optionally, the actuators are operated to direct the illumination to the entire surface of the vehicle that is painted (e.g., excluding the undercarriage), for example, in multiple iterations, where in each iteration the actuators are operated to re-oriented the illumination elements to a different region of the vehicle. Alternatively, a sufficient number of illumination elements are provided to illuminate the entire surface of the vehicle.

At 204, image sensors capture multiple images. The image sensors may be operated to capture the multiple images, for example, instructed to acquire images simultaneously with the operating illumination elements, i.e., to acquire illuminated images.

The multiple image sensors are of different modalities sensing at different frequency bands. Alternatively or additionally, the multiple image sensors sense at different polarization angles.

The multiple image sensors may include a fiber optic probe designed for capturing close-range images for performing close-range analysis.

A set of images, where each image sensor captures at least one image of the same region of the surface of the vehicle, may be captured. Multiple sets of images may be captured, where each set of images is for a common region of the vehicle, where the common region varies between the sets of images.

The image sensors may be oriented to capture multiple image of a same region of the vehicle. The orientation may be adapted, for example by operating one or more actuators, to direct the image sensors to captures images of different regions of the vehicle. The actuator may re-position the image sensors to another location in space, in two dimensions and/or in three dimensions. The actuators may adjust the view of the image sensors at the same location, for example, by adjusting the angle/tilt of the image sensors.

Optionally, the actuators are operated to direct the image sensors to capture images covering the entire surface of the vehicle that is painted (e.g., excluding the undercarriage), for example, in multiple iterations, where in each iteration the actuators are operated to re-oriented the image sensors to a different region of the vehicle. Alternatively, a sufficient number of image sensors are provided to capture images covering the entire surface of the vehicle.

At 206, multiple features are extracted from the images.

Optionally, different features are extracted from different images captured by different image sensors. The different images may be of the same set, depicting a common region of the surface of the vehicle.

The different features for the different image sensors may be extracted using different extraction engine, each designed to extract one or more features on a different type of illuminated image. The extraction engines may be implemented as, for example, machine learning models trained to extract features (e.g., trained on a training dataset of sample illuminated images labelled with ground truth labels of extracted features), image processing code designed to extract features using image processing approaches (e.g., edge detection, image intensity patterns, and the like), a set of rules, and the like.

At 208, one or more features described with reference to 202-206 may be iterated. The iterations may be for different imaging modalities, where each image modality includes an illumination element(s) that generates illumination at a selected frequency band, a corresponding image sensor(s), and a corresponding feature extraction engine designed to extract features from the illuminated images captured by the image sensor of the imaging modality.

The iterations may be performed simultaneously, where the multiple imaging modalities are operated simultaneously. The multiple different types of illumination elements of the different imaging modalities simultaneously apply the illumination, and the multiple different image sensors of the different imaging modalities simultaneously capture illuminated images of different types. The simultaneous illumination and image capture may be implemented where different frequency bands are used, such that there is no (or no significant) interference between imaging modalities occurs. Alternatively, the iterations may be performed sequentially, where in each iteration a different imaging modality is operated. The sequential operation may be implemented where interference (or significant interference) between imaging modalities occurs.

The following is an exemplary process for synchronizing between the imaging modalities, optionally for simultaneously capturing images by the multiple different sensors:

Hardware Synchronization: The sensors of the different modalities may be triggered by a common clock signal.

Temporal Alignment: Sub-millisecond timing accuracy may be defined across the different modalities.

Coordinated Illumination: The different illumination sources (e.g., UV, polarized, spectroscopy) may be activated simultaneously.

Parallel Data Acquisition: Multiple image sensors of the different imaging modalities may be operated to concurrently capture images.

Feature extraction may be performed in parallel or sequentially, such as according to availability of processing resources.

Exemplary imaging modalities and corresponding extractable features are now described.

One exemplary imaging modality is an ultraviolet (UV) fluorescence imaging subsystem. The UV fluorescence imaging subsystem includes one or more UV illumination elements (e.g., light emitting diode (LED) arrays) operating at about 365 nanometer (nm) wavelength, and one or more fluorescence cameras, optionally equipped with a filter(s) designed for isolating specific wavelength ranges. The wavelength ranges are selected to correspond to frequencies emitted by the paint in response to the UV illumination, optionally 400-700 nm. In other words, the UV illumination elements (e.g., excitation sources) illuminate vehicle surfaces with 365 nm UV light, causing fluorescent compounds in paint layers to emit visible light in the 400-700 nm range. The fluorescence cameras may capture these emissions through specialized filters that isolate specific wavelength ranges.

The features extractable from images captured by the UV fluorescence imaging subsystem include a fluorescent signature. The unique fluorescent signatures of different paint formulations may be used to detect paint anomalies (e.g., repair and/or refinishing operations). Original equipment manufacturer (OEM) paints contain specific fluorescent compounds that emit characteristic signatures when exposed to UV radiation. Aftermarket paints, primers, and repair materials exhibit different fluorescent properties, creating detectable variations in the emitted light spectrum.

The fluorescent signature is generated by fluorescent compounds in paint formulations emitting emit characteristic signatures that are captured by the fluorescence cameras in response to the UV excitation sources illuminating the paint surface. Inconsistencies may be indicative of the paint anomaly. Exemplary more specific extractable features for UV and/or fluorescent (e.g., UV and/or fluorescent feature) include:

Fluorescence intensity values, optionally wavelength specific and/or for a range of wavelengths. Optionally, variations of the fluorescent intensity values. The fluorescent intensity values may indicate different paint formulations. Normalized ratios between specific wavelength bands may be computed to account for the variations between the different paint formulations.

Spectral shift patterns suggesting primer or basecoat differences.

Peak wavelength identification.

Chemical signature vectors (e.g., N-dimensional).

Fluorescence uniformity disruptions indicating repair boundaries.

Fluorescence decay patterns, optionally temporal patterns. The fluorescence decay patterns may indicate differences revealing paint age inconsistencies.

Another exemplary imaging modality is a polarized light analysis subsystem that includes polarized light sources with adjustable polarization angles, and image sensors associated with a polarization filter(s) designed to analyze reflected light characteristics. The polarized light sources may emit linearly polarized light at multiple angles (e.g., 0°, 45°, 90°, 135°) while the polarization filters and image sensors may capture reflected light characteristics. An analysis process may evaluate polarization-dependent reflectance variations that indicate surface texture inconsistencies, coating thickness differences, and paint layer disruptions.

The polarized light analysis subsystem may be designed to evaluate surface characteristics through controlled polarization examination. Paint repair and refinishing operations often result in subtle surface texture variations, coating thickness differences, and reflectance property changes that are detectable through polarized light analysis.

The features extractable by the polarized light analysis subsystem may include polarization-dependent reflectance properties that indicate the paint anomaly, surface texture variations that indicate surface texture inconsistencies, coating thickness differences, and/or paint layer disruptions. Exemplary more specific extractable features for the polarized light (e.g., polarized features) include:

Reflection, for example, represented as a coefficient matrix (or matrices). Optionally degree of polarization measurements for surface texture evaluation.

Polarization angle responses, for example, analysis for coating thickness assessment.

Surface roughness indicators (e.g., determination), for example, using depolarization measurements.

Gloss measurement vectors.

Polarization contrast analysis for repair boundary detection.

Yet another exemplary imaging modality is a spectroscopic examination subsystem. The spectroscopic examination subsystem is designed to perform non-destructive chemical composition analysis to identify paint anomalies (e.g., formulation differences), primer layers, and/or chemical markers. Near-infrared spectroscopy may provide detailed information about organic compounds, pigments, and/or additives in paint formulations.

The spectroscopic examination subsystem may include near-infrared spectroscopy devices covering wavelengths from about 800-2500 nm. The illumination element is designed to illuminate in the corresponding wavelength range of about 800-2500 nm. The spectroscopy system may be designed to analyze reflected and/or transmitted light in the 800-2500 nm range, for identifying characteristic absorption bands of paint components. The fiber optic probes may be used for close-range analysis of specific vehicle areas. A spectral analysis process may compare measured spectra against reference databases of known paint formulations.

The features extractable by the spectroscopic examination subsystem may include non-destructive chemical composition analysis to compute one or more chemical analysis parameters. Examples of the extractable features (e.g., chemical analysis parameter, spectroscopic features) include:

Paint formulation differences.

Spectral absorption peaks.

Chemical composition ratios.

Molecular bond signatures.

Wavelength intensity arrays.

Organic compound identification for paint type determination.

Pigment analysis for color matching verification.

Additive detection for formulation consistency assessment.

Primer layer identification for repair detection.

Chemical markers indicative of the paint anomaly.

Yet another exemplary imaging modality is a visual camera, such as a RGB camera, optionally a standard camera capturing images in the visible range. The illumination element may be designed to illuminate in the corresponding visible spectrum, optionally white light, or specific colors or combination of colors. Alternatively, no illumination element is necessarily used, such as when sufficient sunlight is available. Examples of the extractable features (e.g., visual/RGB features) include:

Color space coordinates (RGB, HSV, LAB).

Texture analysis parameters.

Edge detection responses.

Surface pattern descriptors.

At 210, a multi-dimensional dataset is generated by including and/or aggregating the different extractable features.

Optionally, the multi-dimensional dataset is generated by concatenating the different extractable features into a single data structure.

The different extractable feature may be represented as vectors. The multi-dimensional dataset may be generated by concatenating the different vectors.

Optionally, metadata of the vehicle is added to the multi-dimensional dataset. Examples of metadata include: vehicle manufacturer, year of manufacture, vehicle model, geographical location of manufacturing, and color.

The multi-dimensional dataset may be mathematically represented as follows:

Multi-dimensional Dataset=[UV_features|Polarized-_features|Spectro_features|Visual_features]

where:

UV_features=[f1_uv, f2_uv, . . . , fn_uv],

Polarized_features=[f1_pol, f2_pol, . . . , fm_pol],

Spectro_features=[f1_spec, f2_spec, . . . , fk_spec],

Visual_features=[f1_vis, f2_vis, . . . , fj_vis],

Final Dataset=[$f1\_uv, f2\_uv, \ldots, fn\_uv, f1\_pol, f2\_pol, \ldots, fm\_pol, f1\_spec, f2\_spec, \ldots, fk\_spec, f1\_vis, f2\_vis, \ldots, fj\_vis$].

Optionally, the features from the different imaging modalities are aggregated by computing new features based on a combination of the features from the different imaging modalities. The combination features may be included in the multi-dimensional dataset:

Spatial Aggregation: Using features from the different modalities from multiple spatial locations on vehicle surface. Regional averaging and variance calculations may be performed. Multi-scale feature pyramids may be computed.

Temporal Aggregation: Using multiple measurements of the different modalities over time. Statistical measures (e.g., mean, std, min, max) may be computed. Trend analysis vectors may be computed.

Cross-Modal Correlation: Feature correlation matrices between modalities may be computed. Normalized cross-correlation coefficients may be computed.

Mutual information features. Features of the different modalities which correspond to the same or similar parameters may be aggregated to increase the accuracy of the parameter.

At 212, the multi-dimensional dataset is fed into a machine learning model (also referred to herein as artificial intelligent (AI) system).

Exemplary architectures of the machine learning model(s) include, for example, one or more of: a detector architecture, a classifier architecture, and/or a pipeline combination of detector(s) and/or classifier(s), for example, statistical classifiers and/or other statistical models, neural networks of various architectures (e.g., convolutional, fully connected, deep, encoder-decoder, recurrent, transformer, graph), support vector machines (SVM), logistic regression, k-nearest neighbor, decision trees, boosting, random forest, a regressor, and/or any other commercial or open source package allowing regression, classification, dimensional reduction, supervised, unsupervised, semi-supervised, and/or reinforcement learning. Machine learning models may be trained using supervised approaches and/or unsupervised approaches.

Optionally, the AI system processes data through several stages:

Data preprocessing and normalization.

Feature extraction from multi-spectral measurements (e.g., as described with reference to 206 and 208.

Pattern recognition for paint anomaly identification.

Correlation analysis between different sensing modalities.

Decision-making logic for final assessment.

Pattern recognition processes may be designed to identify subtle indicators of paint repair including: fluorescence signature variations, polarization anomalies, spectroscopic inconsistencies, and multi-modal correlation patterns. A decision-making logic process may be designed to weigh evidence from all sensing modalities to generate comprehensive authenticity assessments with confidence levels.

At 214, the machine learning may be trained. The machine learning model may be trained in advance of implementing the other features described with reference to FIG. 2, and/or may be dynamically updated after and/or during implementing the other features described with reference to FIG. 2.

The machine learning model may be trained on a training dataset of records. One or more records may be created for each sample vehicle of multiple sample vehicles. One subset of sample vehicles includes a paint anomaly. Another subset of the sample vehicles does not include (i.e., is without/ excludes) the paint anomaly, i.e., includes only authentic paint. The sample vehicles may be of different types that are expected to be evaluated, for example, a mix of vehicles of different manufacturers and/or different models and/or different colors, optionally within a certain geographical region. For example, vehicles commonly sold in the United States may be included in the training dataset for a machine learning model to be used in the United States. Vehicles found in other countries but not commonly found in the United States may be excluded. A different training dataset may be created for those vehicles, for example, for a different country and/or different geographical region.

The record may be created by iterating the features 202-210 for each sample vehicle. The features may be iterated for each set of illuminated images of a different common region of the sample vehicle, such as for covering the entire surface of the vehicle.

Each record includes the multi-dimensional dataset and a ground truth label indicating whether the sample vehicle depicts the paint anomaly or does not depict the paint anomaly.

The machine learning model is trained on the training dataset.

At 216, data may be analyzed for detecting insufficient coverage of the surface of the vehicle.

The data that is analyzed may include the captured images and/or output of the machine learning model, such as the confidence score (e.g., probability of accuracy) generated by the machine learning model relative to a threshold.

Optionally, the captured images of the vehicle (e.g., illuminated images) are analyzed to identify a region of the vehicle that is not captured in at least one image. The region is not depicted in any of the images. Alternatively or additionally, the captured images of the vehicle are analyzed to identify a region of the vehicle that is not adequately depicted in at least one image. The region is captured in at least one image, but not adequately depicted to enable a proper analysis for paint anomalies. For example, a region may be captured at a large viewing angle by the sensor, such that the surface within the region appears much smaller than it actually is. Alternatively or additionally, the machine learning model generates a confidence score of detection below a threshold for a certain region.

At 218, in response to detecting insufficient coverage of the surface of the vehicle, the illumination element(s) and/or image sensor(s) may be calibrated and/or adjusted.

The calibration and/or adjustment may be performed according to a prediction that the region will be depicted, and/or adequately depicted in the images captured after the calibration and/or adjustment.

The calibration and/or adjustment may be performed according to a prediction that the machine learning model will generate a confidence score above the threshold when fed the image(s) captured after the calibration and/or adjustment.

One or more parameters of the image sensors and/or of illumination elements may be adapted. The parameters include for example: pose (position and/or orientation (view)), frequency of illumination, intensity of illumination, focus, and the like.

The actuator(s) of the image sensor(s) and/or the illumination element(s) may be operated to adjust the pose of the illumination element(s) and/or image sensor(s).

The calibration and/or adjustment may be computed, for example, by a mapping dataset that maps the missing region, inadequate region, and/or low confidence score, to an adjustment of the parameters of the illumination element(s) and/or image sensor(s). The mapping dataset may be implemented as, for example, a set of rules, a deterministic process, and/or another machine learning model trained on a training dataset of an indication of the missing region, inadequate region, and/or multi-dimensional dataset associated with low confidence score (e.g., below the threshold), and a ground truth of the adjustment of the parameters that provided coverage of the missing region and/or inadequate region and/or increased the confidence score above the threshold.

The calibration and/or adjustment may be iterated until a confidence score of the detection of the region of the paint anomaly by the machine learning model exceeds a threshold and/or until the entire surface (or target surface) of the vehicle is adequately depicted in images.

Alternatively or additionally, the adjustment and/or calibration may be performed as a predetermined process in order to fully adequately image the vehicle. The scanning process may covers vehicle surfaces in overlapping patterns to ensure complete coverage and eliminate blind spots. Image sensor actuators (e.g., positioning mechanisms) may adjust for vehicle geometry and/or surface curvature, maintaining optimal measurement conditions throughout the analysis process.

The sensor may be performed using multi-modal sensor calibration approach.

An exemplary process for calibration of UV fluorescence may be based on one or more of the following:

Reference Standards: Known paint samples with documented fluorescence signatures.

Wavelength Calibration: Using mercury vapor lamps with known emission lines.

Intensity Calibration: Certified fluorescence standards (e.g., quinine sulfate).

Examples of parameters and/or features of UV fluorescence that may be adjusted based on the calibration, include:

Excitation wavelength settings

Detection sensitivity levels

Filter transmission coefficients

Integration time parameters

Polarized Light Calibration:

Reference Surfaces: Calibrated reflection standards (BaSO4, spectralon)

An exemplary process for calibration of polarization may be based on one or more of the following:

Polarization Standards: Known polarizing filters at certified angles

Examples of parameters and/or features of calibration that may be adjusted based on the calibration, include:

Polarizer angle accuracy ($\pm 0.1°$).

Light source intensity uniformity.

Detector linearity corrections.

Angular response calibration.

An exemplary process for calibration of spectroscopy may be based on one or more of the following:

Wavelength Standards: Holmium oxide glass standards

Intensity Standards: NIST-traceable reflectance standards

Examples of parameters and/or features of spectroscopy that may be adjusted based on the calibration, include:

Wavelength accuracy corrections.

Spectral bandwidth settings.

Dark current compensation.

Stray light corrections.

The machine learning model may be calibrated. For example, by setting hyperparameters of the ML model according to, and/or further training the ML model on, specific images of specific vehicles which are predicted to be presented to the ML model, for example, per geographical location and/or at certain times of the year.

A system-level calibration may be performed.

An environmental compensation and spatial calibration may be performed.

At 220, an indication of one or more regions of the vehicle with a paint anomaly is obtained from the machine learning model.

The paint anomaly may be a classification category that encompasses one or more sub-types of paint anomalies. Alternatively, the machine learning model may generate an indication of the sub-type(s) of paint anomalies that were detected.

Examples of the paint anomaly include: paint layer inconsistencies, chemical composition variations, surface texture anomalies, paint repair signatures, refinishing patterns, and authenticity markers.

At 222, an enhanced image depicting the region of the vehicle with the paint anomaly overlaid with a visual indication of the region with the paint anomaly, may be generated. The visual indication may be implemented as, for example, a bounding box (or other boundary) sized to encompass the paint anomaly, an arrow pointing to the paint anomaly, a coloring of the paint anomaly with a distinct color, and the like.

The enhanced image may be directly outputted by the machine learning model, for example, when the machine learning model is implemented as a detector model, and is fed an image of the vehicle, optionally captured by a visible light camera.

Alternatively or additionally, the enhanced image may be created by selecting an image of the vehicle that depicts the region that includes the paint anomaly, optionally captured by a visible light camera. The indication of the paint anomaly generated by the machine learning model may be overlaid on the image to generate the enhanced image.

At 224, the enhanced image is provided, for example, for presentation on a display, storage on a data storage device, forwarded to a remote device, and/or fed into another executing process (e.g., that estimates financial cost of fixing).

The enhanced image may be presented within a user interface optionally a graphical user interface (GUI) designed to enable a user to interact with the enhanced image. For example, zooming in/out, clicking on the paint anomaly to obtain more details (e.g., sub-type), scrolling through different detected paint regions, and the like.

The user interface may present one or more of the following:

Overall authenticity assessment.

Detailed findings from each imaging modality.

Anomaly location mapping.

Confidence levels and/or uncertainty measures.

Recommended follow-up actions.

Additional exemplary embodiments are now provided.

According to at least one embodiment, a multi-modal automotive paint authentication and repainting detection system comprises: a UV fluorescence imaging subsystem including UV excitation sources operating at 365 nm wavelength and fluorescence cameras for capturing fluorescent signatures of paint surfaces. The system further includes a polarized light analysis subsystem that includes polarized light sources with adjustable polarization angles and polarization detection sensors for analyzing surface texture variations and coating thickness differences. The system may further include a spectroscopic examination subsystem that includes near-infrared spectroscopy devices covering 800-2500 nm wavelengths for chemical composition analysis. The system further includes an AI process configured to process multi-spectral data from all sensing modalities and generate paint authenticity assessments through pattern recognition algorithms.

Optionally, the UV fluorescence imaging subsystem further comprises specialized filters for isolating specific wavelength ranges and positioning mechanisms for optimal coverage of vehicle surfaces.

Optionally, the polarized light analysis subsystem is configured to emit linearly polarized light at multiple angles including 0°, 45°, 90°, and 135° for comprehensive surface characteristic evaluation.

Optionally, the spectroscopic examination subsystem includes fiber optic probes for close-range analysis and spectral analysis processors for comparing measured spectra against reference databases of known paint formulations.

Optionally, the AI process comprises neural networks trained on datasets of authentic and repaired paint samples for accurate pattern recognition and anomaly detection.

Optionally, the system further comprises a user interface for displaying overall authenticity assessment, detailed findings from each sensing modality, anomaly location mapping, and confidence levels.

According to at least one embodiment, a method for detecting automotive paint repairs and refinishing operations comprises: illuminating vehicle surfaces with UV excitation sources and capturing fluorescent signatures using fluorescence cameras, analyzing surface characteristics through polarized light examination at multiple polarization angles, performing spectroscopic analysis to identify chemical composition variations in paint formulations, and processing multi-spectral data through AI processes to identify paint authenticity inconsistencies.

Optionally, the UV fluorescence analysis identifies fluorescence intensity variations, spectral shift patterns, fluorescence uniformity disruptions, and temporal fluorescence decay differences.

Optionally, the polarized light analysis evaluates degree of polarization measurements, polarization angle analysis, depolarization measurements, and polarization contrast analysis.

Optionally, the spectroscopic analysis identifies organic compound composition, pigment characteristics, additive presence, and primer layer detection.

Optionally, the AI process includes data preprocessing, feature extraction, pattern recognition, correlation analysis, and decision-making logic for comprehensive authenticity assessment.

Optionally, the method further comprises generating analysis reports with overall authenticity assessment, detailed findings, anomaly locations, confidence levels, and recommended follow-up actions.

According to at least one embodiment, an automotive paint analysis apparatus comprises: a sensor array including UV fluorescence cameras, polarized light sources and detectors, and spectroscopy units configured for simultaneous multi-modal analysis, positioning mechanisms for maintaining optimal measurement conditions across vehicle surfaces, and AI processing system configured to correlate data from multiple sensing modalities and identify paint repair indicators through machine learning models.

Optionally, the sensor array is configured to scan vehicle surfaces in overlapping patterns to ensure complete coverage and eliminate blind spots.

Optionally, the AI processing system includes neural networks trained to recognize fluorescence signature variations, polarization anomalies, spectroscopic inconsistencies, and multi-modal correlation patterns.

Optionally, the apparatus further comprises calibration systems for maintaining sensor accuracy and data quality across different environmental conditions.

Optionally, the apparatus is configured for non-destructive analysis suitable for insurance assessment, fraud detection, and vehicle history verification applications.

According to at least one embodiment, a computer program product for automotive paint authenticity analysis comprises: program instructions for processing multi-spectral data from UV fluorescence, polarized light, and spectroscopic measurements, pattern recognition models trained to identify paint repair and refinishing indicators, decision-making logic for generating comprehensive authenticity assessments with confidence levels.

Optionally, the pattern recognition models are configured to analyze fluorescence signatures, polarization characteristics, and chemical composition data to detect paint inconsistencies.

Optionally, the computer program product further comprises user interfaces for displaying analysis results, anomaly locations, and detailed findings from each imaging (e.g., sensing) modality.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant machine learning models will be developed and the scope of the term machine learning model is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral)

within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A system for automatically detecting paint anomalies on a surface of a vehicle, comprising:

a plurality of illumination elements configured for generating a plurality of illuminations of different types at a first plurality of different frequency bands and/or at a first plurality of different polarization angles, positioned for illuminating the vehicle;

a plurality of image sensors of a plurality of different modalities configured for sensing at a second plurality of different frequency bands and/or at a second plurality of different polarization angles configured for capturing a plurality of images of a vehicle;

a data interface configured to access and/or receive a plurality of images captured by the plurality of image sensors during illumination by the plurality of illumination elements;

at least one processor configured for:

operating the plurality of illumination elements for illuminating the vehicle;

operating the plurality of image sensors for capturing the plurality of images;

extracting a plurality of features from the plurality of images;

generating a multi-dimensional dataset by aggregating the plurality of features;

feeding the multi-dimensional dataset into a machine learning model;

obtaining from the machine learning model, an indication of a region of the vehicle with a paint anomaly;

generating an enhanced image depicting the region of the vehicle with the paint anomaly overlaid with a visual indication of the region with the paint anomaly; and presenting the enhanced image on a display, wherein the at least one processor is configured for creating a training dataset of a plurality of records by:

creating a record for each sample vehicle of a plurality of sample vehicles including a first subset with a paint anomaly and a second subset without a paint anomaly:

operating the plurality of illumination elements for illuminating the sample vehicle;

operating the plurality of image sensors for capturing a plurality of images of different modalities of the sample vehicle;

extracting at least one feature from each of the plurality of images of different modalities; and generating a multi-dimensional dataset from the plurality of features, wherein the record for the sample vehicle includes the multi-dimensional dataset and a ground truth label indicating whether the sample vehicle depicted the paint anomaly or did not depict the paint anomaly; and training the machine learning model on the training dataset.

2. A system for automatically detecting paint anomalies on a surface of a vehicle, comprising:

a plurality of illumination elements configured for generating a plurality of illuminations of different types at a first plurality of different frequency bands and/or at a first plurality of different polarization angles, positioned for illuminating the vehicle;

a plurality of image sensors of a plurality of different modalities configured for sensing at a second plurality of different frequency bands and/or at a second plurality of different polarization angles configured for capturing a plurality of images of a vehicle;

a data interface configured to access and/or receive a plurality of images captured by the plurality of image sensors during illumination by the plurality of illumination elements;

at least one processor configured for:

operating the plurality of illumination elements for illuminating the vehicle;

operating the plurality of image sensors for capturing the plurality of images;

extracting a plurality of features from the plurality of images;

generating a multi-dimensional dataset by aggregating the plurality of features;

feeding the multi-dimensional dataset into a machine learning model;

obtaining from the machine learning model, an indication of a region of the vehicle with a paint anomaly;

generating an enhanced image depicting the region of the vehicle with the paint anomaly overlaid with a visual indication of the region with the paint anomaly; and presenting the enhanced image on a display, wherein the plurality of illumination elements and the plurality of image sensors are arranged into the plurality of imaging modalities, selected from:

(i) an ultraviolet (UV) fluorescence imaging subsystem including at least one UV illumination element operating at about 365 nanometer (nm) wavelength, at least one fluorescence camera equipped with at least one filter for isolating specific wavelength ranges selected from 400-700 nm emitted by the paint in response to the UV illumination, (ii) a polarized light analysis subsystem including polarized light sources with adjustable polarization angles, and image sensors associated with polarization filter configured to analyze reflected light characteristics, (iii) a spectroscopic examination subsystem including near-infrared spectroscopy devices covering wavelengths from about 800-2500 nm, and (iv) and a red-green-blue (RGB) camera.

3. The system of claim 2, further comprising calibrating at least one of the plurality of image sensors and/or at least one of the plurality of illumination elements according to output of the machine learning model in response to the feeding.

4. The system of claim 3, wherein the calibration is performed by adapting one or more parameters of the at least one of the plurality of image sensors and/or at least one of the plurality of illumination elements until a confidence score of the detection of the region of the paint anomaly by the machine learning model exceeds a threshold.

5. The system of claim 2, further comprising analyzing the plurality of images of the vehicle to identify an inadequate region of the vehicle that is not captured in at least one image and/or is not adequately depicted in at least one image to obtain a confidence score of detection above a threshold, and operating at least one actuator of at least one of the plurality of image sensors and/or at least one of the plurality of illumination elements for adapting a pose and/or field of view thereof until the inadequate region is adequately captured in at least one image for obtaining the confidence score of detection above the threshold.

6. The system of claim 2, wherein the plurality of illumination elements simultaneously generate illumination, and the plurality of image sensors simultaneously capture the plurality images during the illumination.

7. The system of claim 2, wherein at least one feature of the plurality of features for a UV fluorescence imaging subsystem comprises a fluorescent signature generated by fluorescent compounds in paint formulations emitting characteristic signatures that are captured by at least one fluorescence camera in response to the UV excitation sources illuminating the paint surface, wherein inconsistencies are indicative of the paint anomaly.

8. The system of claim 7, wherein the at least one feature is selected from: fluorescence intensity variations indicating different paint formulations, spectral shift patterns suggesting primer or basecoat differences, fluorescence uniformity disruptions indicating repair boundaries, and temporal fluorescence decay differences revealing paint age inconsistencies.

9. The system of claim 2, wherein at least one feature of the plurality of features for a polarized light analysis subsystem comprises polarization-dependent reflectance properties that indicate the paint anomaly, surface texture variations that indicate surface texture inconsistencies, coating thickness differences, and paint layer disruptions.

10. The system of claim 9, wherein the at least one feature is selected from: degree of polarization measurements for surface texture evaluation, polarization angle analysis for coating thickness assessment, depolarization measurements for surface roughness determination, and polarization contrast analysis for repair boundary detection.

11. The system of claim 2, wherein at least one feature of the plurality of features for a spectroscopic examination subsystem comprises non-destructive chemical composition analysis to compute at least one chemical analysis parameter.

12. The system of claim 11, wherein the at least one chemical analysis parameter is selected from: paint formulation differences, organic compound identification for paint type determination, pigment analysis for color matching verification, additive detection for formulation consistency assessment, primer layer identification for repair detection, chemical markers indicative of the paint anomaly.

13. A system for automatically detecting paint anomalies on a surface of a vehicle, comprising:

a plurality of illumination elements configured for generating a plurality of illuminations of different types at a first plurality of different frequency bands and/or at a first plurality of different polarization angles, positioned for illuminating the vehicle;

a plurality of image sensors of a plurality of different modalities configured for sensing at a second plurality of different frequency bands and/or at a second plurality of different polarization angles configured for capturing a plurality of images of a vehicle;

a data interface configured to access and/or receive a plurality of images captured by the plurality of image sensors during illumination by the plurality of illumination elements;

at least one processor configured for:

operating the plurality of illumination elements for illuminating the vehicle;

operating the plurality of image sensors for capturing the plurality of images;

extracting a plurality of features from the plurality of images;

generating a multi-dimensional dataset by aggregating the plurality of features;

feeding the multi-dimensional dataset into a machine learning model;

obtaining from the machine learning model, an indication of a region of the vehicle with a paint anomaly;

generating an enhanced image depicting the region of the vehicle with the paint anomaly overlaid with a visual indication of the region with the paint anomaly; and presenting the enhanced image on a display, wherein the at least one processor is further comprising adding metadata of the vehicle to the multi-dimensional dataset fed into the machine learning model, the metadata including at least one of: vehicle manufacturer, year of manufacture, vehicle model, geographical location of manufacturing, and color.

14. A system for automatically detecting paint anomalies on a surface of a vehicle, comprising:

a plurality of illumination elements configured for generating a plurality of illuminations of different types at a first plurality of different frequency bands and/or at a first plurality of different polarization angles, positioned for illuminating the vehicle;

a plurality of image sensors of a plurality of different modalities configured for sensing at a second plurality of different frequency bands and/or at a second plurality of different polarization angles configured for capturing a plurality of images of a vehicle;

a data interface configured to access and/or receive a plurality of images captured by the plurality of image sensors during illumination by the plurality of illumination elements;

at least one processor configured for:

operating the plurality of illumination elements for illuminating the vehicle;

operating the plurality of image sensors for capturing the plurality of images;

extracting a plurality of features from the plurality of images;

generating a multi-dimensional dataset by aggregating the plurality of features;

feeding the multi-dimensional dataset into a machine learning model;

obtaining from the machine learning model, an indication of a region of the vehicle with a paint anomaly;

generating an enhanced image depicting the region of the vehicle with the paint anomaly overlaid with a visual indication of the region with the paint anomaly; and presenting the enhanced image on a display; and a fiber optic probe configured for close-range analysis.

15. A system for automatically detecting paint anomalies on a surface of a vehicle, comprising:

a plurality of illumination elements configured for generating a plurality of illuminations of different types at a first plurality of different frequency bands and/or at a first plurality of different polarization angles, positioned for illuminating the vehicle;

a plurality of image sensors of a plurality of different modalities configured for sensing at a second plurality of different frequency bands and/or at a second plurality of different polarization angles configured for capturing a plurality of images of a vehicle;

a data interface configured to access and/or receive a plurality of images captured by the plurality of image sensors during illumination by the plurality of illumination elements;

at least one processor configured for:

operating the plurality of illumination elements for illuminating the vehicle;

operating the plurality of image sensors for capturing the plurality of images;

extracting a plurality of features from the plurality of images;

generating a multi-dimensional dataset by aggregating the plurality of features;

feeding the multi-dimensional dataset into a machine learning model;

obtaining from the machine learning model, an indication of a region of the vehicle with a paint anomaly;

generating an enhanced image depicting the region of the vehicle with the paint anomaly overlaid with a visual indication of the region with the paint anomaly; and presenting the enhanced image on a display, wherein the paint anomaly is selected from: paint layer inconsistencies, chemical composition variations, surface texture anomalies, paint repair signatures, refinishing patterns, and authenticity markers.

\* \* \* \* \*